(12) United States Patent
Cho (10) Patent No.: US 11,926,372 B2
(45) Date of Patent: Mar. 12, 2024

(54) MOTOR-DRIVEN POWER STEERING SYSTEM FOR VEHICLE (71) Applicants: Hyundai Motor Company, Seoul (KR); Kia Corporation, Seoul (KR)

(72) Inventor: Sung Shik Cho, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 267 days.

(21) Appl. No.: 17/467,553

(22) Filed: Sep. 7, 2021

(65) Prior Publication Data
US 2022/0363307 A1    Nov. 17, 2022

(30) Foreign Application Priority Data
May 14, 2021   (KR) ......................... 10-2021-0062675

(51) Int. Cl.
| | |
|---|---|
| B62D 5/04 | (2006.01) |
| B62D 3/04 | (2006.01) |
| F16H 55/24 | (2006.01) |
| F16H 57/021 | (2012.01) |
| F16H 57/04 | (2010.01) |

(52) U.S. Cl.
CPC ............ *B62D 5/0409* (2013.01); *B62D 3/04* (2013.01); *B62D 5/0403* (2013.01); *B62D 5/0454* (2013.01); *F16H 55/24* (2013.01); *F16H 57/021* (2013.01); *F16H 57/041* (2013.01); *F16H 57/0469* (2013.01); *F16H 2057/0213* (2013.01)

(58) Field of Classification Search
CPC .. B62D 5/0409; B62D 5/0403; B62D 5/0454; B62D 3/04; F16H 55/24; F16H 57/021; F16H 57/041; F16H 57/0469; F16H 2057/0213
See application file for complete search history.

(56) References Cited

U.S. PATENT DOCUMENTS

| | | | |
|---|---|---|---|
| 2019/0211884 A1* | 7/2019 | Ishii | ......................... F16D 3/74 |
| 2020/0156697 A1* | 5/2020 | Jordan | .................... F16H 55/24 |
| 2020/0208735 A1* | 7/2020 | Guerin | .................... F16H 57/12 |
| 2020/0255063 A1* | 8/2020 | Kong | ...................... F16H 55/24 |

FOREIGN PATENT DOCUMENTS

KR    10-2016-0002512 A    1/2016

* cited by examiner

*Primary Examiner* — Tony H Winner
(74) *Attorney, Agent, or Firm* — Morgan, Lewis & Bockius LLP (57) ABSTRACT

A motor-driven power steering system for a vehicle is configured such that movement of the worm shaft and a clearance caused by backlash between the worm wheel and the worm shaft may be prevented using the bearing-integrated damper bush which is coupled to the end portion of the worm shaft and is made of steel, and during of rotation of the worm shaft, the lubricant is supplied between the worm shaft and the bearing-integrated damper bush to facilitate lubrication and cooling.

12 Claims, 6 Drawing Sheets

MOTOR-DRIVEN POWER STEERING SYSTEM FOR VEHICLE

CROSS-REFERENCE TO RELATED APPLICATION

The present application claims priority to Korean Patent Application No. 10-2021-0062675, filed May 14, 2021, the entire contents of which is incorporated herein for all purposes by this reference.

BACKGROUND OF THE INVENTION

Field of the Invention

The present invention relates to a motor-driven power steering system for a vehicle, and more specifically, to a technology regarding a motor-driven power steering system for a vehicle, wherein a bearing-integrated damper bush coupled to an end portion of a worm shaft may be used to prevent movements of the worm shaft and to prevent a clearance caused by backlash between a worm wheel and the worm shaft.

Description of Related Art

In general, a motor-driven power steering system refers to a device having an electronic control device configured to assist the driver's steering power by driving a driving member according to vehicle traveling conditions detected by a speed sensor, a steering torque sensor, and the like.

When a vehicle is traveling at a low speed, a light and comfortable steering state is commonly provided. When the vehicle is traveling at a high speed, a heavy and stable steering state is provided. In an emergency, rapid steering is enabled, contributing to improved traveling safety.

A motor-driven power steering system includes a driver (motor), a worm shaft connected to the driver and rotated thereby, and a worm wheel meshing with the worm shaft and rotating accordingly, a steering shaft being coupled through the center portion of the worm wheel.

Therefore, rotational power of the worm shaft, resulting from motor driving, is added to rotational power of the steering wheel operated by the driver and is transferred to the steering shaft, facilitating improved and stable steering.

A coupler-side bearing is coupled to an end portion of the worm shaft connected to the motor side such that the worm shaft is allowed to tilt, to prevent jamming between teeth of the worm wheel and the worm shaft during vehicle traveling.

A worm shaft bearing is coupled to another end portion of the worm shaft to prevent movements of the worm shaft and to prevent a clearance caused by backlash between the worm wheel and the worm shaft. Furthermore, an anti-rattle spring assembly (a spring sheet, a spring, and a push rod) for pressurizing and supporting the worm shaft bearing in the circumferential direction, a worm shaft bush for supporting the worm shaft in the axial direction, and a plug are provided thereon.

However, the worm shaft bearing, the anti-rattle spring assembly (a spring sheet, a spring, and a push rod), the worm shaft bush, the plug, and the like, which are used to prevent movement and clearance of the worm shaft, have a problem in that the large number of complicated and heavy components increases the manufacturing cost.

The worm shaft bearing, which employs a ball bearing, is vulnerable to noise occurrence.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a motor-driven power steering system for a vehicle, wherein a bearing-integrated damper bush coupled to an end portion of a worm shaft is used to prevent movements of the worm shaft and to prevent a clearance caused by backlash between a worm wheel and the worm shaft such that multiple components conventionally used, such as a worm shaft bearing, an anti-rattle spring assembly (a spring sheet, a spring, and a push rod), a worm shaft bush, and a plug, are combined into a single bearing-integrated damper bush, simplifying the structure, reducing the weight, saving costs, and reducing noise to the largest extent.

A motor-driven power steering system for a vehicle according to various exemplary embodiments of the present invention includes: a worm shaft engaged with a worm wheel coupled to a steering shaft, received in a housing, and rotated by power received from a motor; and a bearing-integrated damper bush fitted onto an external circumferential surface of an end portion of the worm shaft, supported by the housing, and configured to prevent movement of the worm shaft and a clearance caused by backlash between the worm wheel and the worm shaft.

A lubricant collecting part is formed in the housing; the lubricant collecting part is filled with a lubricant; and the end portion of the worm shaft, together with the bearing-integrated damper bush, is installed to be immersed in the lubricant.

The lubricant collecting part always remains in a state of being filled with the lubricant due to the weight of the lubricant.

A hollow groove is concavely formed in the end portion of the worm shaft; a plurality of lubricant discharge holes fluidically connecting the hollow groove to an external circumferential surface of the end portion of the worm shaft are formed; and the bearing-integrated damper bush is fitted onto the end portion of the worm shaft so that an internal circumferential surface of the bearing-integrated damper bush faces the plurality of lubricant discharge holes.

A plurality of shaft protrusions is formed on an internal circumferential surface of the hollow groove and protrude toward an inside of the hollow groove; and when the worm shaft rotates, the plurality of shaft protrusions rotates the lubricant to allow the lubricant to be introduced into the plurality of lubricant discharge holes.

When the worm shaft rotates, the lubricant existing in the hollow groove is introduced to the internal circumferential surface of the bearing-integrated damper bush through the plurality of lubricant discharge holes by centrifugal force and facilitates lubrication and cooling between the worm shaft and the bearing-integrated damper bush.

The bearing-integrated damper bush is formed of steel, is formed in a circular annular shape having a predetermined section thickness and width, and is provided to be fitted onto the external circumferential surface of the worm shaft and supported by the housing.

A Teflon coating is applied on the internal circumferential surface of the bearing-integrated damper bush, and thus the bearing-integrated damper bush functions as a bearing during rotation of the worm shaft.

The bearing-integrated damper bush includes a plurality of support protrusions which protrude outward; and the plurality of support protrusions is supported by the housing, preventing the movement of the worm shaft and the clearance caused by backlash between the worm wheel and the worm shaft.

The plurality of support protrusions is formed integrally with the bearing-integrated damper bush by incising portions of the bearing-integrated damper bush through press processing and causing the incised portions to protrude outward.

The plurality of support protrusions includes: a right support protrusion configured to exert a supporting force with respect to the housing when a steering wheel is rotated in a clockwise direction for turning a vehicle to the right; and a left support protrusion configured to exert a supporting force with respect to the housing when the steering wheel is rotated in a counterclockwise direction for turning the vehicle to the left. The right support protrusion and the left support protrusion are disposed to be symmetrical left and right about a center portion of the bearing-integrated damper bush.

The plurality of support protrusions includes: a right side support protrusion spaced from the right support protrusion in the clockwise direction and configured to withstand a right lateral load; and a left side support protrusion spaced from the left support protrusion in the counterclockwise direction and configured to withstand a left lateral load. The right side support protrusion and the left side support protrusion are disposed to be symmetrical left and right about the center portion of the bearing-integrated damper bush.

A motor-driven power steering system for a vehicle according to various exemplary embodiments of the present invention is advantageous in that a bearing-integrated damper bush made of steel and coupled to an end portion of a worm shaft is used to prevent movements of the worm shaft and to prevent a clearance caused by backlash between a worm wheel and the worm shaft such that, by reducing the number of components, structure simplification, weight reduction, and cost saving can be accomplished, and in particularly, noise reduction can be reduced to the largest extent.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

A specific structural or functional description of embodiments of the present invention included in the specification or application is provided merely for describing the exemplary embodiment according to various exemplary embodiments of the present invention. Therefore, the exemplary embodiments according to various exemplary embodiments of the present invention may be implemented in various forms, and the present invention should not be construed as being limited to the exemplary embodiments described in the specification or application.

Various changes and modifications may be made to the exemplary embodiments according to various exemplary embodiments of the present invention, and therefore various exemplary embodiments will be illustrated in the drawings and described in the specification or application. However, it should be understood that embodiments according to the concept of the present invention are not limited to the particular disclosed exemplary embodiments of the present invention, but the present invention includes all modifications, equivalents, and alternatives falling within the spirit and scope of the present invention.

Such terms as "a first" and/or "a second" may be used to described various elements, but the elements should not be limited by these terms. These terms are intended merely to distinguish one element from other elements. For example, a first element may be named a second element and similarly a second element may be named a second element without departing from the scope of protection of the present invention.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to any other component, it should be understood that there is no component therebetween. The other expressions of describing a relation between structural elements, i.e. "between" and "merely between" or "neighboring" and "directly neighboring", should be interpreted similarly to the above description.

The terms used in various exemplary embodiments of the present invention are merely used to describe specific embodiments, and are not intended to limit the present invention. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which various exemplary embodiments of the present invention pertains. Such terms as those defined in a generally used dictionary may be interpreted to have the meanings equal to the contextual meanings in the relevant field of art, and are not to be interpreted to have ideal or excessively formal meanings unless clearly defined in various exemplary embodiments of the present invention.

A control unit (controller) according to exemplary embodiments of the present invention may be implemented through a non-volatile memory configured to store data on an algorithm configured to control operations of various components of a vehicle or software instructions for reproducing the algorithm, and a processor configured to perform operations as described below by use of the data stored in the corresponding memory. The memory and the processor may be implemented as separate chips. Alternatively, the memory and the processor may be implemented as an integrated single chip. The processor may be in a form of one or more processors.

Hereinafter, a motor-driven power steering system for a vehicle according to various exemplary embodiments of the present invention will be described with reference to the accompanying drawings.

As illustrated in FIGS. 1 to 6, a motor-driven power steering (MDPS) system for a vehicle according to various exemplary embodiments of the present invention includes: a housing 100; a worm wheel 200 received in the housing 100 and integrally coupled to a steering shaft 10 extending through the center portion thereof; a worm shaft 300 received in the housing 100 and rotating integrally with the worm wheel 200 while meshing with the worm wheel 200; a coupler-side bearing 400 coupled to one end portion of the worm shaft 300; a motor 500 which is connected to one end portion of the worm shaft 300 extending through the coupler-side bearing 400 and provides power to rotate the worm shaft 300 when being driven by control of a controller (ECU); and a bearing-integrated damper bush 600 which is fitted onto the external circumferential surface of the other end portion of the worm shaft 300, is supported by the housing 100, and prevents movement of the worm shaft 300 and a clearance caused by backlash between the worm wheel 200 and the worm shaft 300.

Figure 1:
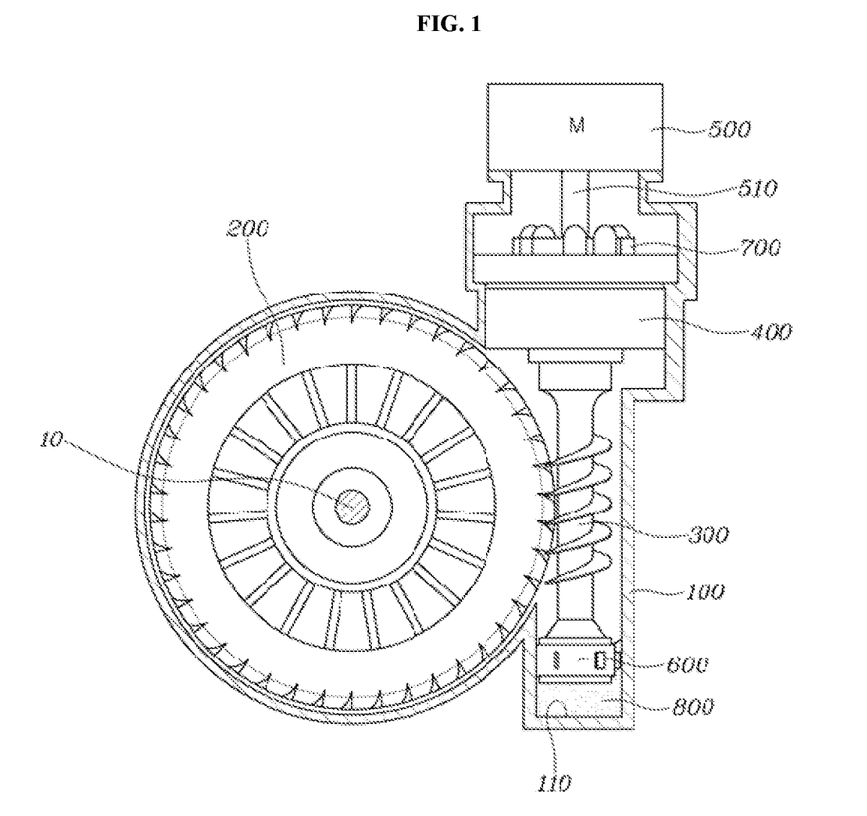
FIG. 1 illustrates a schematic configuration of a motor-driven power steering system for a vehicle according to various exemplary embodiments of the present invention.

One end portion of the worm shaft 300 is connected to a motor shaft 510 via a flexible coupling 700 interposed therebetween to receive power from the motor 500.

The coupler-side bearing 400 acts as restricting movement of the worm shaft 300 in the axial direction thereof.

Furthermore, the coupler-side bearing 400 also acts as facilitating the tilting of the worm shaft 300 to prevent jamming between teeth of the worm wheel 200 and the worm shaft 300.

That is, the coupler-side bearing 400 includes: an internal ring press-fitted/coupled to the external circumferential surface of one end portion of the worm shaft 300; an external ring fixed to the housing 100; and a plurality of ball bearings inserted into bearing grooves of the internal and external rings to allow the internal and external rings to rotate relative to each other. The bearing grooves formed in the internal and external rings are formed to have elliptical shapes that are greater than the ball bearings, and thus the coupler-side bearing 400 allows the worm shaft 300 to tilt.

The housing 100 according to various exemplary embodiments of the present invention has a lubricant collecting portion 110 formed therein and having a predetermined space, and the lubricant collecting portion 110 is filled with a lubricant 800 for lubrication and cooling.

In one example, grease is used as the lubricant 800, and to lubricate and cool the bearing-integrated damper bush 600 by the lubricant 800, the worm shaft 300 is provided such that the other end portion of the worm shaft 300, together with the bearing-integrated damper bush 600, is inserted into the lubricant collecting portion 110 and immersed in the lubricant 800.

The inside of the lubricant collecting portion 110 always remains filled with the lubricant 800 due to the weight of the lubricant 800. Therefore, there is no demand for a separate device configured for storing the lubricant 800 in the lubricant collecting portion 110, thus facilitating weight reduction and cost reduction.

Figure 2:
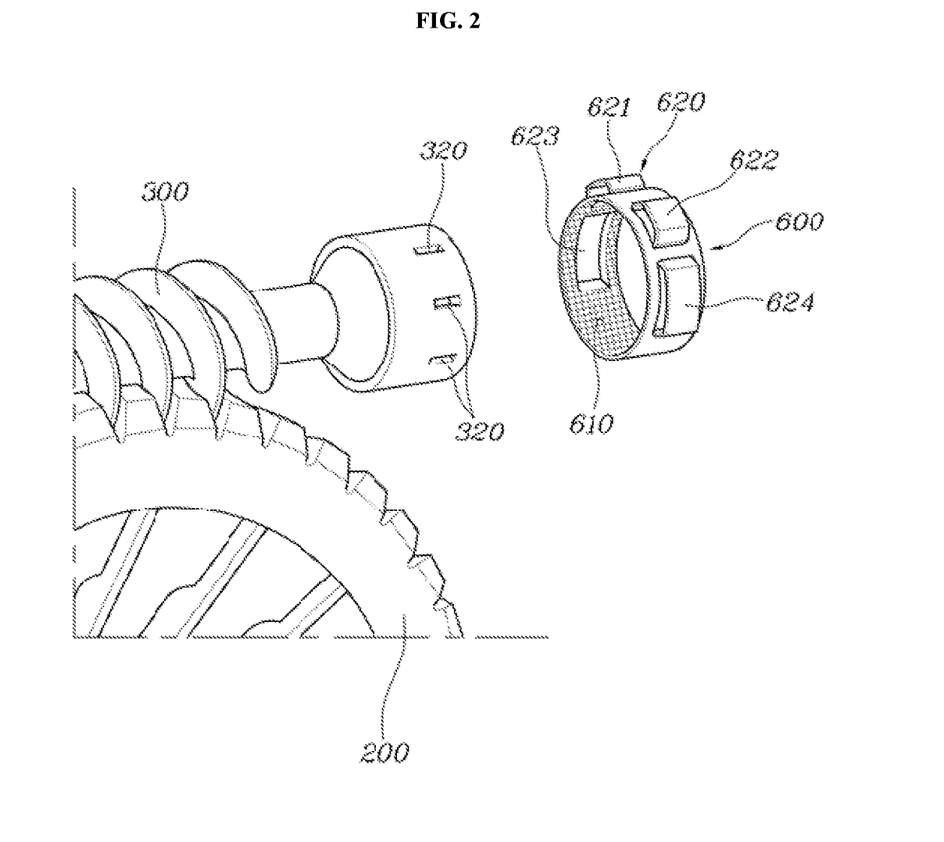
FIG. 2 illustrates a state in which a worm shaft and a bearing-integrated damper bush are separated from each other according to various exemplary embodiments of the present invention.
Figure 3:
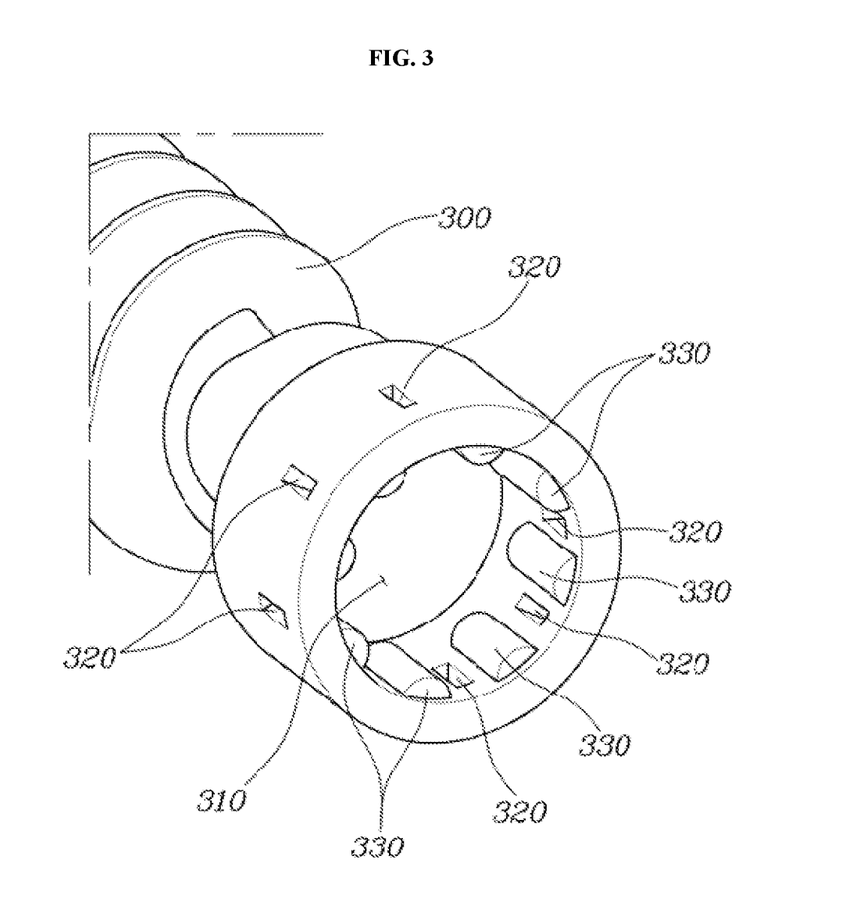
FIG. 3 illustrates a hollow groove, lubricant discharge holes, and shaft protrusions, which are formed at a worm shaft according to various exemplary embodiments of the present invention.
Figure 4:
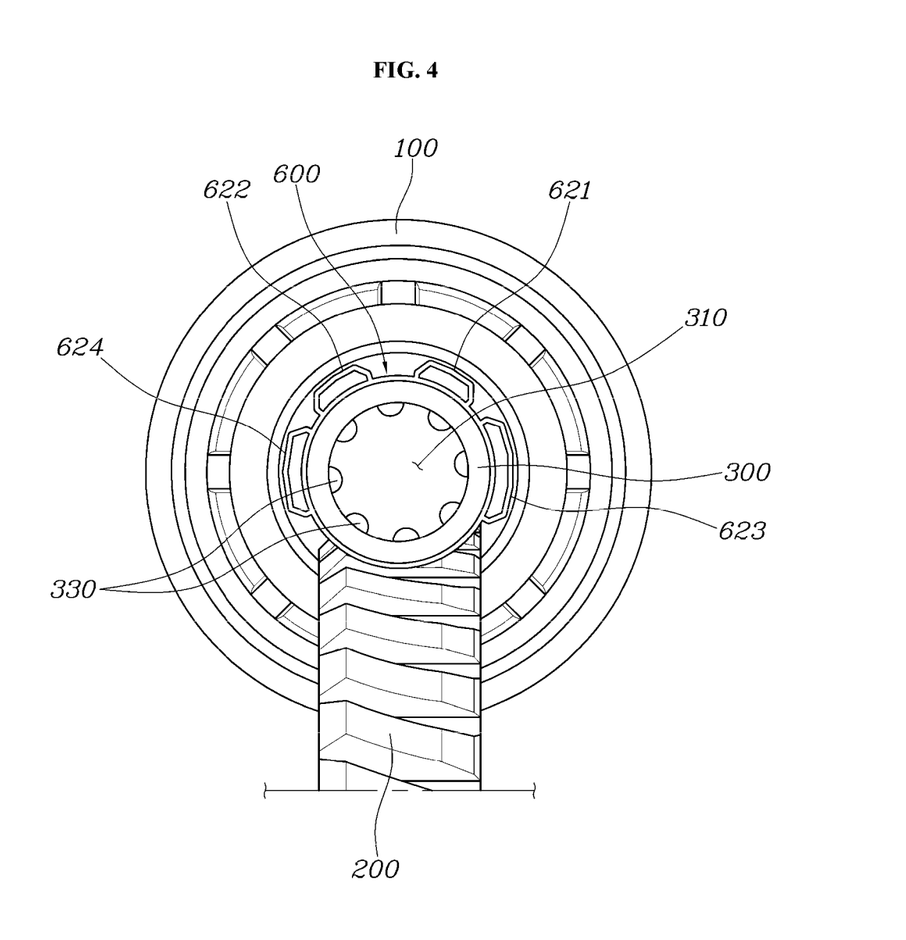
FIG. 4 is a front view exemplarily illustrating a state in which a worm shaft and a bearing-integrated damper bush are coupled to each other according to various exemplary embodiments of the present invention.

A hollow groove 310 is formed in the other end portion of the worm shaft 300 and recessed concavely from the other end portion of the worm shaft 300. A plurality of lubricant discharge holes 320 connecting the hollow groove 310 to the external circumferential surface of the other end portion of the worm shaft 300 are formed in the circumferential direction of the worm shaft 300 while being spaced from each other. The bearing-integrated damper bush 600 is fitted and provided onto the other end portion of the worm shaft 300 such that the internal circumferential surface of the bearing-integrated damper bush 600 faces the plurality of lubricant discharge holes 320.

When the other end portion of the worm shaft 300, to which the bearing-integrated damper bush 600 is coupled, is inserted into the lubricant collecting portion 110 filled with the lubricant 800, the lubricant 800 is filled into the hollow groove 310 of the worm shaft 300.

A plurality of shaft protrusions 330 are formed on the internal circumferential surface of the hollow groove 310 of the worm shaft 300, and are spaced from each other in the circumferential direction while protruding toward the inside of the hollow groove 310.

When the worm shaft 300 rotates using power of the motor 500, the plurality of shaft protrusions 330 rotates and circulates the lubricant 800. At the instant time, the lubricant 800 is introduced into the plurality of lubricant discharge holes 320 by centrifugal force or the rotation caused by the plurality of shaft protrusions 330, and finally, the lubricant 800 is introduced to the internal circumferential surface of the bearing-integrated damper bush 600 through the plurality of lubricant discharge holes 320 and facilitates lubrication and cooling between the worm shaft 300 and the bearing-integrated damper bush 600.

Figure 5:
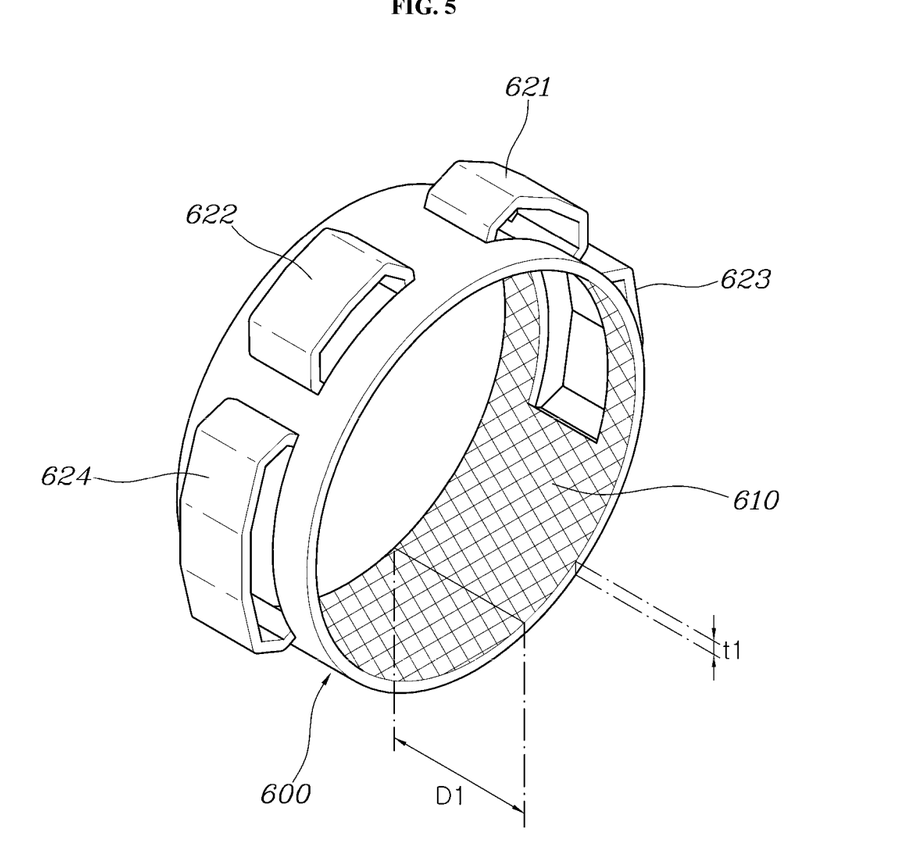
FIG. 5 and FIG. 6 are a perspective view and a front view of a bearing-integrated damper bush according to various exemplary embodiments of the present invention, respectively.
Figure 6:
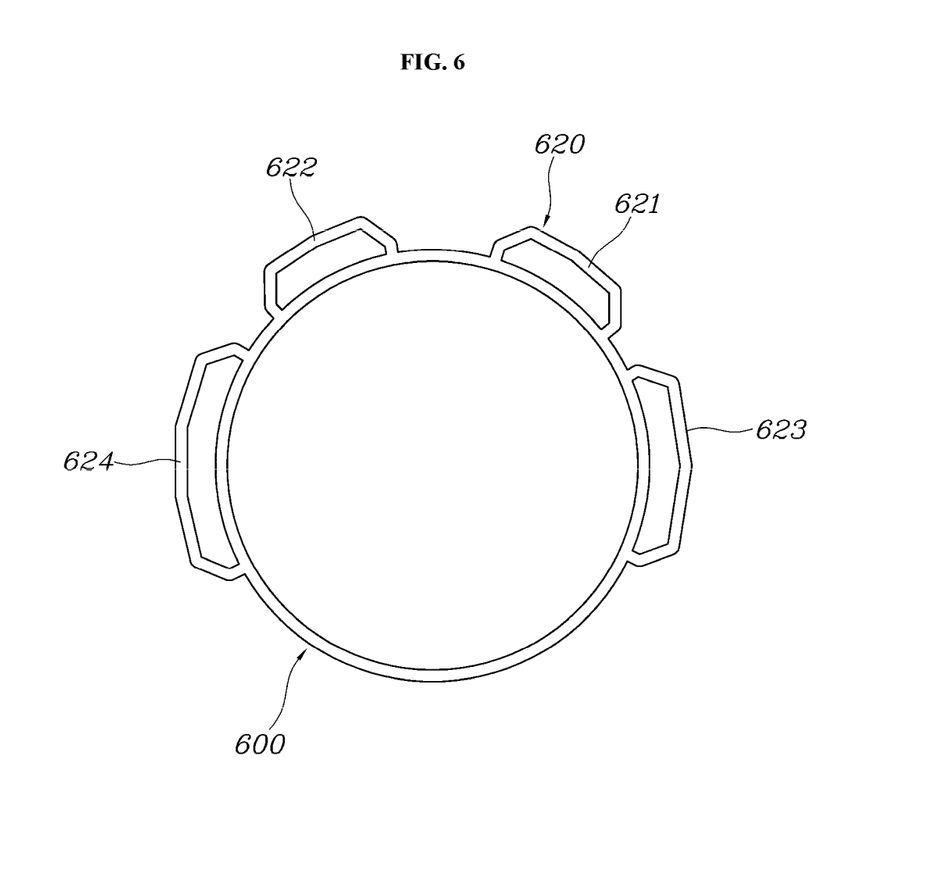

The bearing-integrated damper bush 600 according to various exemplary embodiments of the present invention is formed of steel, is formed in a circular annular shape having a predetermined section thickness (t1) and width (D1), and is provided to be fitted onto the external circumferential surface of the other end portion of the worm shaft 300 and supported by the housing 100.

A Teflon coating 610 is applied on the internal circumferential surface of the bearing-integrated damper bush 600 to reduce frictional interference with the worm shaft 300, and thanks to the Teflon coating 610, the bearing-integrated damper bush 600 functions as a bearing during rotation of the worm shaft 300.

The bearing-integrated damper bush 600 includes a plurality of support protrusions 620 which protrude outward. The plurality of support protrusions 620 may be provided to be supported by the housing 100, and thus movement of the worm shaft and a clearance caused by backlash between the worm wheel 200 and the worm shaft 300 may be prevented by the bearing-integrated damper bush 600.

The plurality of support protrusions 620 formed on the bearing-integrated damper bush 600 are formed integrally with the bearing-integrated damper bush 600 by incising portions of the bearing-integrated damper bush 600 through press processing and then causing the incised portions to protrude outward. The plurality of support protrusions 620 include: a right support protrusion 621 configured to exert a supporting force with respect to the housing 100 when a steering wheel is rotated in the clockwise direction for turning a vehicle to the right; a left support protrusion 622 configured to exert a supporting force with respect to the housing 100 when the steering wheel is rotated in the counterclockwise direction for turning the vehicle to the left; a right side support protrusion 623 spaced from the right support protrusion 621 in the clockwise direction and configured to withstand a right lateral load; and a left side support protrusion 624 spaced from the left support protrusion 622 in the counterclockwise direction and configured to withstand a left lateral load.

The right support protrusion 621 and the left support protrusion 622 are disposed to be symmetrical left and right about the center portion of the bearing-integrated damper bush 600. Furthermore, the right side support protrusion 623 and the left side support protrusion 624 are disposed to be symmetrical left and right about the center portion of the bearing-integrated damper bush 600. Thus, there is an advantage in that the bearing-integrated damper bush 600 can exert a stable supporting force through contact with the housing 100, and may be commonly used as necessary because the plurality of support protrusions 620 are disposed to be symmetrical left and right.

As described above, the motor-driven power steering system for a vehicle according to various exemplary embodiments of in various aspects of the present invention, the movement of the worm shaft 300 and the clearance caused by backlash between the worm wheel 200 and the worm shaft 300 may be prevented using the bearing-integrated damper bush 600 which is coupled to the end portion of the worm shaft 300 and is made of steel. Therefore, the motor-driven power steering system can have a simplified structure, a reduced weight, and a reduced cost through the reduction of the number of components, and can minimize the generation of noise as much as possible.

Furthermore, various exemplary embodiments of the present invention are configured such that, during of rotation of the worm shaft 300, the lubricant 800 is supplied between the worm shaft 300 and the bearing-integrated damper bush 600 to facilitate lubrication and cooling therebetween, and thus operation noise may be reduced and durability may be improved.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A motor-driven power steering system for a vehicle, the motor-driven power steering system comprising:
   a housing;
   a worm shaft engaged with a worm wheel coupled to a steering shaft, wherein the worm shaft is received in the housing, and rotated by power received from a motor; and
   a bearing-integrated damper bush fitted onto an external circumferential surface of a first end portion of the worm shaft, supported by the housing, so as to prevent movement of the worm shaft and a clearance caused by backlash between the worm wheel and the worm shaft,
   wherein a lubricant collecting portion is formed in the housing,
   wherein the lubricant collecting portion is filled with a lubricant, and
   wherein the first end portion of the worm shaft, together with the bearing-integrated damper bush, is provided to be immersed in the lubricant.

2. The motor-driven power steering system of claim 1, wherein the lubricant collecting portion continuously remains in a state of being filled with the lubricant due to a weight of the lubricant.

3. The motor-driven power steering system of claim 1,
   wherein a hollow groove is concavely formed in the first end portion of the worm shaft,
   wherein a plurality of lubricant discharge holes fluidically connecting the hollow groove to the external circumferential surface of the first end portion of the worm shaft is formed on the first end portion of the worm shaft, and
   wherein the bearing-integrated damper bush is fitted onto the first end portion of the worm shaft so that an internal circumferential surface of the bearing-integrated damper bush faces the plurality of lubricant discharge holes.

4. The motor-driven power steering system of claim 3, wherein a plurality of shaft protrusions is formed on an internal circumferential surface of the hollow groove and protrudes toward an inside of the hollow groove, and wherein, when the worm shaft rotates, the plurality of shaft protrusions rotates the lubricant to allow the lubricant to be introduced into the plurality of lubricant discharge holes.

5. The motor-driven power steering system of claim 3, wherein, when the worm shaft rotates, the lubricant existing in the hollow groove is introduced to the internal circumferential surface of the bearing-integrated damper bush through the plurality of lubricant discharge holes by centrifugal force and facilitates lubrication and cooling between the worm shaft and the bearing-integrated damper bush.

6. The motor-driven power steering system of claim 1, wherein the bearing-integrated damper bush is formed of steel, is formed in a circular annular shape having a predetermined section thickness and width, and is provided to be fitted onto the external circumferential surface of the first end portion of the worm shaft and supported by the housing.

7. The motor-driven power steering system of claim 1, wherein a Teflon coating is applied on an internal circumferential surface of the bearing-integrated damper bush, and thus the bearing-integrated damper bush functions as a bearing during rotation of the worm shaft.

8. The motor-driven power steering system of claim 1,
wherein the bearing-integrated damper bush includes a plurality of support protrusions which protrude outward of an external circumferential surface of the bearing-integrated damper bush, and
wherein the plurality of support protrusions is supported by the housing, preventing the movement of the worm shaft and the clearance caused by the backlash between the worm wheel and the worm shaft.

9. The motor-driven power steering system of claim 8, wherein the plurality of support protrusions is formed integrally with the bearing-integrated damper bush by incising portions of the bearing-integrated damper bush through press processing and causing the incised portions to protrude outward.

10. The motor-driven power steering system of claim 8, wherein the plurality of support protrusions includes:
a right support protrusion configured to exert a supporting force with respect to the housing when a steering wheel is rotated in a clockwise direction for turning the vehicle to the right; and
a left support protrusion configured to exert a supporting force with respect to the housing when the steering wheel is rotated in a counterclockwise direction for turning the vehicle to the left,
wherein the right support protrusion and the left support protrusion are disposed to be symmetrical left and right about a center portion of the bearing-integrated damper bush.

11. The motor-driven power steering system of claim 10, wherein the plurality of support protrusions further includes:
a right side support protrusion spaced from the right support protrusion in the clockwise direction and configured to withstand a right lateral load; and
a left side support protrusion spaced from the left support protrusion in the counterclockwise direction and configured to withstand a left lateral load,
wherein the right side support protrusion and the left side support protrusion are disposed to be symmetrical left and right about the center portion of the bearing-integrated damper bush.

12. The motor-driven power steering system of claim 1, wherein a second end portion of the worm shaft is connected to a motor shaft of the motor via a flexible coupling.

* * * * *